United States Patent
Roeland et al.

(10) Patent No.: US 9,843,646 B2
(45) Date of Patent: Dec. 12, 2017

(54) ASSIGNING ADDRESSES IN A COMMUNICATIONS NETWORK

(71) Applicant: TELEFONAKTIEBOLAGET L M ERICSSON (PUBL), Stockholm (SE)

(72) Inventors: Dinand Roeland, Sollentuna (SE); Michael Eriksson, Sollentuna (SE); Rashmi Purushothama, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 60 days.

(21) Appl. No.: 14/440,136

(22) PCT Filed: Oct. 31, 2013

(86) PCT No.: PCT/EP2013/072822
§ 371 (c)(1),
(2) Date: May 1, 2015

(87) PCT Pub. No.: WO2014/068062
PCT Pub. Date: May 8, 2014

(65) Prior Publication Data
US 2015/0319270 A1  Nov. 5, 2015

Related U.S. Application Data

(60) Provisional application No. 61/721,683, filed on Nov. 2, 2012.

(51) Int. Cl.
*H04L 29/08* (2006.01)
*H04L 29/12* (2006.01)
*H04L 29/06* (2006.01)

(52) U.S. Cl.
CPC ...... *H04L 67/2833* (2013.01); *H04L 61/2007* (2013.01); *H04L 61/6013* (2013.01); *H04L 69/14* (2013.01); *H04L 61/2053* (2013.01); *H04L 61/2076* (2013.01); *H04L 61/2528* (2013.01); *H04L 61/6077* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 2012/0093150 A1* | 4/2012 | Kini | ........................ | H04L 45/24 370/389 |
| 2012/0144062 A1* | 6/2012 | Livet | ....................... | H04L 45/24 709/239 |
| 2013/0195004 A1* | 8/2013 | Hampel | ................. | H04L 69/16 370/315 |

OTHER PUBLICATIONS

Ford, et al., "TCP Extensions for Multipath Operation with Multiple Addresses draft-ford-mptcp-multiaddressed-03", Internet Engineering Task Force (IETD), Internet-Draft, Mar. 8, 2010.*

(Continued)

*Primary Examiner* — Mohammad Adhami (57) ABSTRACT

A method and apparatus for addressing a message sent from a proxy node to a peer node in a communications network. The proxy node receives from a host node a plurality of multipath messages. Each message of the plurality of multipath messages has an address. The proxy node then applies a rule to assign an address for a single flow message towards the peer node. The single flow message comprises each message of the plurality of multipath messages. The single flow message is then sent towards the peer node.

16 Claims, 5 Drawing Sheets

(56) References Cited

OTHER PUBLICATIONS

Hampel, et al., "Enhancements to Improve the Applicability of Multipath TCP to Wireless Access Networks," draft-hampel-mptcp-applicability-wireless-networks-00; Multipath TCP, Internet-Draft; Intended status: Standards Track; Jun. 15, 2011.
Hampel, et al., "MPTCP Proxies and Anchors," draft-hampel-mptcp-proxies-anchors-00; Multipath TCP, Internet-Draft; Intended-status: Standards Track; Feb. 8, 2012.
Ford, et al., "Architectural Guidelines for Multipath TCP Development," Internet Engineering Task Force (IETF); Request for Comments: 6182; Mar. 2011.
Ford, et al., "TCP Extensions for Multipath Operation with Multiple Addresses," Internet Engineering Task Force, Internet-Draft, Oct. 22, 2012.

\* cited by examiner

| |
|---|
| S6. Proxy determines addresses of host |

↓

| |
|---|
| S7. Proxy selects most suitable address and assigns to single flow between proxy and peer |

↓

| |
|---|
| S8. Proxy uses selected address |

ASSIGNING ADDRESSES IN A
COMMUNICATIONS NETWORK

This application is a 371 of PCT/EP2013/072822, filed Oct. 31, 2013, which claims the benefit of U.S. Provisional Application No. 61/721,683, filed Nov. 2, 2012, the disclosure of which is fully incorporated herein by reference.

TECHNICAL FIELD

The present description relates to the field of assigning addresses in a communications network, and in particular to assigning addresses used by a Multi-path TCP proxy node.

BACKGROUND

A Transmission Control Protocol (TCP) session can be defined as "A logical end-to-end data communication link between two applications, using TCP as protocol". Regular TCP restricts communication to a single path per session. Internet Engineering Task Force (IETF) is currently developing mechanisms to add a capability of simultaneously using multiple paths in a regular TCP session. The extensions to TCP, called "multi-path TCP" (MPTCP) are described in Internet-Draft "http://tools.ietf.org/html/rfc6824". Architectural guidelines for multipath TCP development have been published in RFC 6182. RFC 6182 defines a "path" as a "sequence of links between a sender and a receiver, defined in this context by a source and destination address pair".

In many cases multiple paths exist between peers. An example of this is the case where one or both of the end-devices are multi-homed and/or have connectivity via more than one access technology. For example, in a $3^{rd}$ Generation Partnership Project (3GPP) multi-access scenario, a User Equipment (UE) device may be connected via both a 3GPP access (such as GSM EDGE Radio Access Network, GERAN, Universal Terrestrial Radio Access Network UTRAN, Evolved Universal Terrestrial Radio Access Network E-UTRAN etc.) and a Wireless Local Area Network (WLAN) access simultaneously. The simultaneous use of these multiple paths for a TCP session would improve resource usage within the network, and improve user experience through higher throughput and improved resilience to network failure. The use of MPTCP over multiple accesses would allow the user traffic to be either routed only over one of the accesses or simultaneously over multiple accesses. It would also allow the traffic to be moved in a seamless fashion between accesses depending on coverage, radio link quality or other factors.

Figure 1:
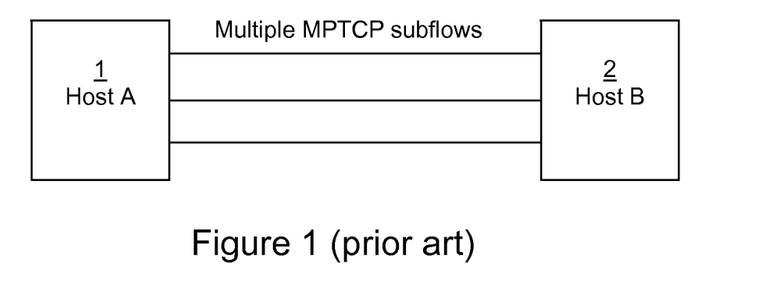
FIG. 1 illustrates schematically in a block diagram an exemplary network architecture for a Multipath Transmission Control Protocol Session between two hosts.

In regular TCP, one TCP session between two hosts corresponds to one TCP flow between those hosts, carried over a single path. Referring to FIG. 1 herein, in MPTCP, one TCP session between two hosts 1, 2 corresponds to one or more MPTCP subflows between those hosts, each carried over a path. A subflow is defined by a 5-tuple (source address, source port, destination address, destination port, protocol).

Figure 2:
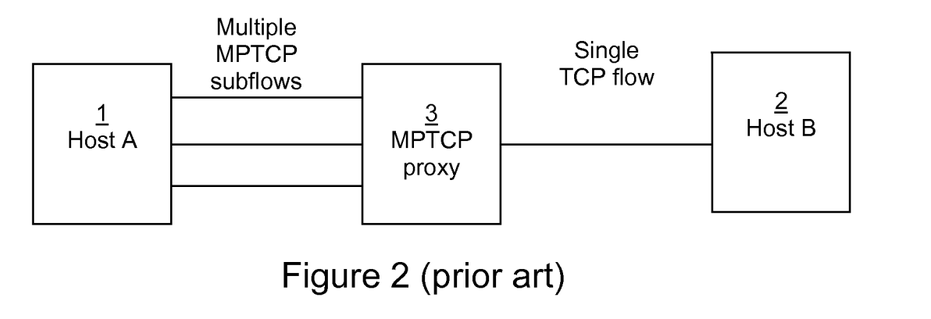
FIG. 2 illustrates schematically in a block diagram an exemplary network architecture for a Multipath Transmission Control Protocol Session between two hosts where one host is not Multipath Transmission Control Protocol capable.

The model illustrated in FIG. 1 requires that both hosts are MPTCP-capable. In practice, when MCTCP is introduced to networks it is likely to be introduced in an incremental way. There is therefore a high probability that only one host will support MPTCP. To overcome this problem, it has been suggested that an MPTCP proxy 3 may be used, as illustrated in FIG. 2. One use case may be that the MPTCP proxy is placed in the network of an operator, and that the MPTCP-capable host is a UE controlled by the operator. Host B, shown in FIG. 2, is not MPTCP-capable. A single TCP session between Host A 1 and Host B 2 corresponds to one or more MPTCP subflows between Host A 1 and a proxy node 3, and to a single TCP flow between the proxy node 3 and Host B 2. The proxy node 3 multiplexes the MPTCP subflows towards Host B 2 into a single TCP flow, and demultiplexes the single flow towards Host A 1 into subflows.

RFC 6182 defines a regular/single-Path TCP as the standard version of TCP in use, operating between a single pair of addresses and ports. Multipath TCP is defined as a modified version of the TCP protocol that supports the simultaneous use of multiple paths between hosts. A path is defined as a sequence of links between a sender and a receiver, defined in this context by a source and destination address pair. A Host is defined as an end host either initiating or terminating a Multipath TCP connection. A subflow is defined as a flow of TCP segments operating over an individual path, which forms part of a larger Multipath TCP connection. A MPTCP connection is defined as a set of one or more subflows combined to provide a single Multipath TCP service to an application at a host. RFC 6182 also notes that MPTCP makes use of (what appear to the network to be) standard TCP sessions, termed "subflows", to provide the underlying transport per path, and as such these retain the network compatibility desired. MPTCP-specific information is carried in a TCP-compatible manner, although this mechanism is separate from the actual information being transferred.

SUMMARY

Figure 3:
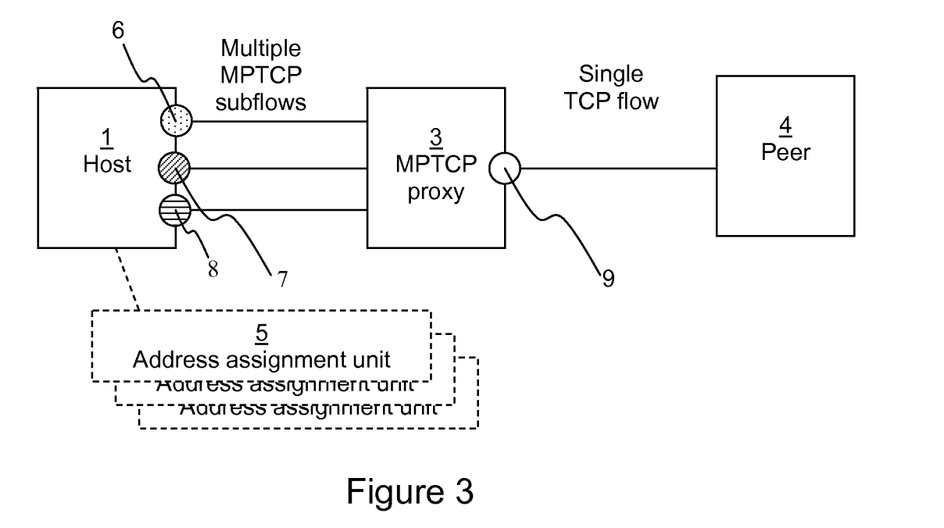
FIG. 3 illustrates schematically in a block diagram an exemplary network architecture for addressing a Multipath Transmission Control Protocol Session between two hosts where one host is not Multipath Transmission Control Protocol capable.

FIG. 3 illustrates a scenario in which a Host 1 is MPTCP capable and a Peer 4 is not MCTCP capable. As described above, the TCP session is sent via an MPTCP proxy 3. The MPTCP stack in the host 1 or in the proxy node 3 may decide to establish one or more MPTCP subflows for the TCP session.

The host 1 has multiple addresses, each assigned by one or more address assignment units 5. For example, the host 1 may be a 3GPP UE with multiple radio interfaces. An address assignment unit 5 may be a network node external to the host. One or more addresses of the host 1 may be assigned by the same address assignment unit 5.

In the example of FIG. 3, there are three MPTCP subflows, each assigned a different address 6, 7, 8.

A problem arises because the MPTCP proxy node 3 has no way of defining which address 9 to use for the single TCP flow between the MPTCP proxy node 3 and the non-MPTCP-capable peer 4.

It is an object to provide a way for an MPTCP proxy node to assign an address to an MPTCP session towards a non-MPTCP capable node.

According to a first aspect, there is provided a method of addressing a message sent from a proxy node to a peer node in a communications network. The proxy node receives, from a host node, a plurality of multipath messages. Each message of the plurality of multipath messages has an address. The proxy node then applies a rule to assign an address for a single flow message towards the peer node. The single flow message comprises each message of the plurality of multipath messages. The single flow message is then sent towards the peer node. An advantage of this is that the proxy node can make a decision as to the best address to use for the single flow message.

As an option, the plurality of multipath messages comprises subflows, for example Multipath Transmission Control Protocol subflows and the single flow message comprises a Transmission Control Protocol. Of course, it will be appreciated that the first aspect may be applied to other multipath messaging protocols.

As an option, the proxy node determines an address for a first message of the plurality of multipath messages. The determined address is assigned to the single flow message towards the peer node. The proxy node then sends an instruction to an address assigning node not to release or re-use the address for the single flow message. An advantage of this is that, even if the host is assigned new addresses, the address used for the single flow message will not change.

As an alternative option, the proxy node determines addresses for each message of the plurality of multipath messages and selecting from the determined addresses an address to use for the single flow message towards the peer node. Again, an instruction is sent to an address assigning node not to release or re-use the address for the single flow message. Optional ways in which this selection can be include performing the selection on the basis of any of a type of network to which each address belongs, an expected life of each address, and a historical life of each address. An advantage of this approach is that the most suitable address can be selected.

Optionally, the determined addresses include at least one address expected to be assigned to the host. In this way, where a host is expected to be assigned an address but has not yet had that address assigned, it can still be used for the single path flow.

As an alternative option, the proxy node assigns an address for the single flow message towards the peer node, the assigned address not being used for any of the plurality of multipath messages. An advantage of this is that the proxy node need not be concerned if the host changes the addresses used towards the proxy node. As a further option, the assigned address is unique to a single host. An advantage of this is that the peer can identify the host.

As an option, the proxy node also performs network address translation on each message of the plurality of multipath messages.

According to a second aspect, there is provided a proxy node for use in a communications network. The proxy node is provided with a first receiver for receiving from a host node a plurality of multipath messages, each message of the plurality of multipath messages having an address. A processor is also provided for applying a rule to assign an address for a single flow message towards a peer node, the single flow message comprising each message of the plurality of multipath messages. A first transmitter is also provided for sending the single flow message the peer node.

As an option, the plurality of multipath messages comprises Multipath Transmission Control Protocol subflows and the single flow message a Transmission Control Protocol message.

The processor is optionally arranged to determine an address for a first message of the plurality of multipath messages and use the determined address for the single flow message towards the peer node. In this case, the proxy node is also provided with a second transmitter for sending to an address assigning node an instruction not to release or re-use the address for the single message.

As an alternative option, the processor is further arranged to determine addresses for each message of the plurality of multipath messages and select, from the determined addresses, an address to use for the single flow message towards the peer node. This allows the processor to select the most suitable address.

As exemplary options, the processor is arranged to perform the selection on the basis of any of a type of network to which each address belongs, an expected life of each address, and a historical life of each address.

The proxy node is optionally provided with a second transmitter for sending to an address assigning node an instruction not to release or re-use the selected address.

As an alternative option, the processor is arranged to assign a new address for the single flow message towards the peer node, the assigned address not being used for any of the plurality of multipath messages.

In this case, the processor is optionally arranged to assign an address that is unique to a single host.

The proxy node is optionally provided with a network address translation function for performing network address translation on each message of the plurality of multipath messages.

According to a third aspect, there is provided a computer program, comprising computer readable code which, when run from a computer readable medium in the form of a memory in a processor in a proxy node, causes the proxy node to perform the method described above in the first aspect.

According to a fourth aspect, there is provided a computer program product comprising a computer readable medium and a computer program as described above in the third aspect, wherein the computer program is stored on the computer readable medium.

There is also disclosed a host node, such as a UE, arranged to send multipath subflows towards a peer via a proxy node. The host terminal may support the peer node, for example by providing details of addresses and so on.

There is also disclosed a method of addressing a message sent from a proxy node to a peer node. The proxy node receives from a host node a request to establish a session with the peer node, the request including an indication that the host is multipath capable. The proxy node forwards the request to the peer node and receives a response. The response indicates whether the peer node is multipath capable. If the peer node is not multipath capable, the proxy node assigns an address to a single flow message comprising a plurality of multipath messages for use between the proxy and the peer node.

As an option, the proxy node changes an original source address of the forwarded request to a new source address, and in the event that the peer node is multipath capable, the proxy node changes the new source address back to the original source address.

As an alternative option, if the peer node is not multipath capable, the proxy node changes an original source address of the forwarded request to a new source address.

DETAILED DESCRIPTION

The description below provides various ways in which a proxy node in a communications network (such as an MPTCP proxy node 3) can address a single flow (such as a TCP flow) towards the peer 4. Note that the description uses the term "address", which may in one embodiment be interpreted as an IPv4 address. The ideas apply just as well to IPv6, in which case the term "IP prefix" is of the address. For the purposes of this description, the term address is equivalent to IP prefix or any other addressing mechanism in a communications network. Furthermore, the address may be any other type of address used to communicate between two nodes where the communication between the host and the proxy includes multipath subflows and the communication between the proxy and the peer is a single path flow. For example, the address may be a combination of an IP address and a TCP port.

Furthermore, the procedures and apparatus described below use the example of the host being a 3GPP UE and the MPTCP proxy node 3 being provided by a 3GPP operator. However, it will be appreciated that the procedures and apparatus could apply to other types of network that use multipath communication flows between a host 1 and a proxy node 3, and a single path communication flow between the proxy node 3 and a peer 4. MPTCP is an exemplary embodiment of these types of communication flow.

It will be appreciated that while the discussion below refers to addressing flows and subflows, the address is applied to packets within the flow. Furthermore, a flow may refer to any kind of passing of data between nodes, including the sending of a single message.

One way to address the problem described above is for the MPTCP proxy node 3 to use the address 6 of the first MPTCP subflow of the TCP session for the single TCP session between the MPTCP proxy node 3 and the peer 4. This approach may, however, have a number of disadvantages.

A first disadvantage is that the host 1 may use another path (in other words, another address) for the first MPTCP subflow of a second TCP session with the same peer 4. The result is that the peer 4 sees different addresses from the host 1 for different TCP flows.

A second disadvantage is that, for the active TCP session, the MPTCP proxy node 3 can only continue to use the address 9 for the single TCP flow towards the peer 4 as long as it is assigned to the host 1. If the address 6 is released from the host 1, the host 1 needs to inform the MPTCP proxy node 3 to release the address, and so the entire TCP session is broken.

Figure 4:
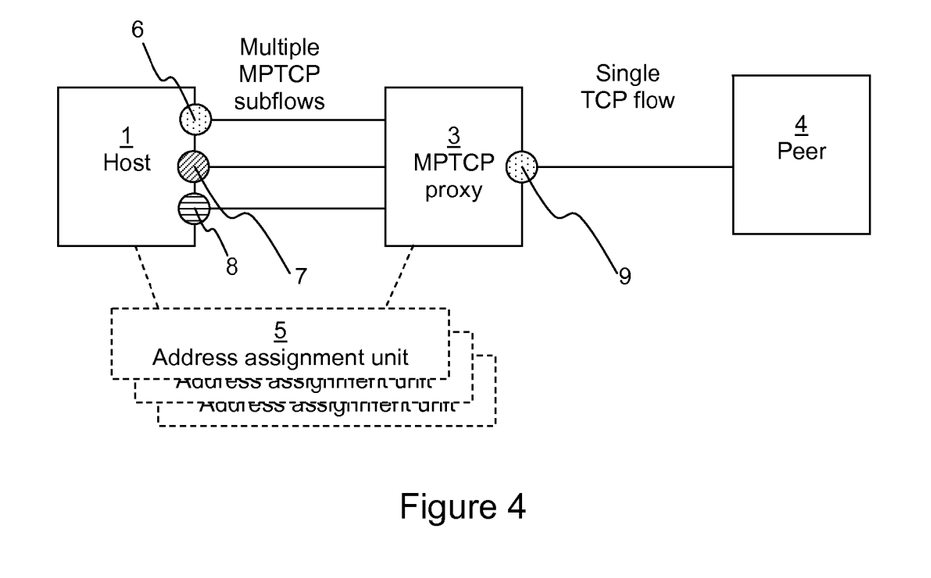
FIG. 4 illustrates schematically in a block diagram an exemplary network architecture for addressing a Multipath Transmission Control Protocol Session between two hosts where one host is not Multipath Transmission Control Protocol capable according to an embodiment.

According to a first embodiment, as illustrated in FIG. 4, the MPTCP proxy node 3 uses the address 6 of the first MPTCP subflow as the address 9 for the first TCP flow between the host 1 and the peer 4, and uses that same address for all subsequent TCP flows between the same host 1 and peer 4 pair.

The address can only be used as long as it is assigned to the host 4. When the address is released from the host 4, the MPTCP proxy node 3 also no longer uses it. In order to inform the MPTCP proxy node 3 that the address can no longer be used, an interface is provided between the MPTCP proxy node 3 and the address assignment unit 5 of the host 1. The MPTCP proxy node may indicate to the address assignment unit 5 that the address cannot be released, or at least not be re-used, as long as the MPTCP proxy node 3 is still using that address.

In the following example, host 1 is a 3GPP UE. The UE 1 acquires its addresses by setting up Packet Data Network (PDN) connections. According to the 3GPP specification, a PDN Gateway (PGW) 5 assigns the address. The UE 1 sets up two PDN connections; one via a Long Term Evolution (LTE) network, the other via a WLAN network. The UE 1 starts a number of TCP sessions. Each TCP session has two subflows, one over each PDN connection.

Suppose the first MPTCP subflow of the first TCP session is setup via WLAN. The MPTCP proxy node 3 chooses a WLAN address for the TCP flow towards the peer 4. Now the UE 1 moves and loses WLAN coverage during the ongoing TCP sessions. This results in the loss of the WLAN subflows. After a certain period of time, another WLAN cell comes in reach and the UE 1 re-attaches to WLAN. The network does not implement any address preservation mechanism, so the UE 1 may receive a new address on WLAN. The UE 1 may add new WLAN subflows.

The WLAN address of the UE 1 has now changed during ongoing TCP sessions. However, in this embodiment, the peer 4 does not see this address change because the MPTCP proxy node 3 continues to use the address of the initial subflow.

If both PDN connections are routed via the same PGW, and the MPTCP proxy node 3 is co-located in that PGW product, then the PGW function interacts with the MPTCP proxy node 3 before assigning an address to a UE 1. The PGW will never assign an address to a second UE 1 that the MPTCP proxy node 3 is still using for the first UE 1.

In this solution, the peer 4 will only see a single host address for the TCP flows. However, the peer 4 may still see a different host address for those TCP sessions where the host decided not to use MPTCP. The peer may also see a different host address for non-TCP traffic from the peer (e.g. UDP traffic).

Figure 5:
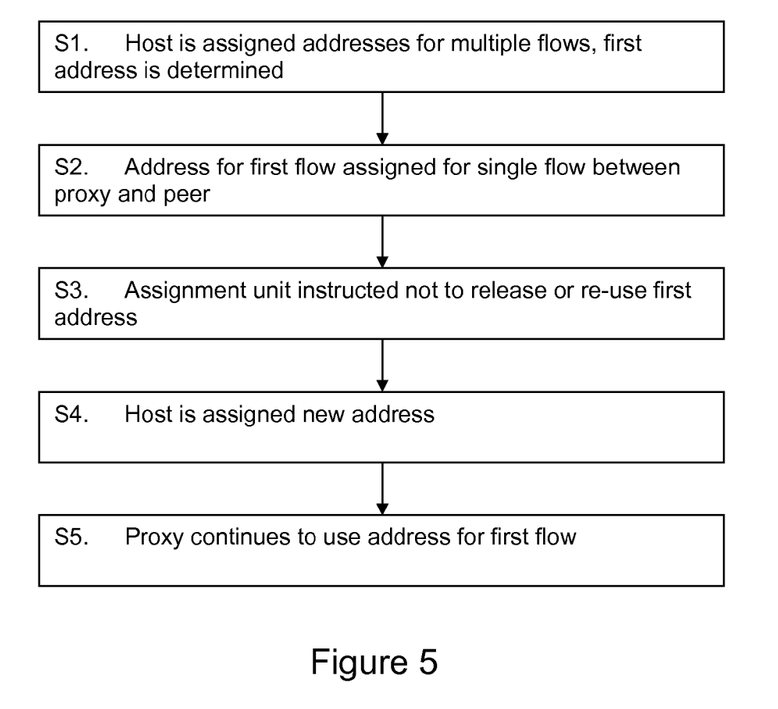
FIG. 5 is a flow diagram illustrating procedures according to the embodiment of FIG. 4.

The procedures above are summarized in FIG. 5. The following numbering corresponds to that of FIG. 5:

S1. The Host 1 is assigned an address for each MPTCP subflow towards the MPTCP proxy node 3. The MPTCP proxy node 3 determines the address of the first subflow.
S2. The MPTCP proxy node 3 uses the address 6 of the first subflow as the address for the single TCP flow 9 towards the peer 4.
S3. The MPTCP proxy node 3 instructs the address assignment unit 5 to either not release or not re-use the first address.
S4. The Host 1 is subsequently assigned a new address, and so the addresses 6, 7, 8 of the subflows change.
S5. The MPTCP proxy 3 continues to use the first address 6 for communications with the peer 4 until the MPTCP session ends. At this point, the MPTCP proxy node 3 can instruct the address assignment unit to release the first address.

Figure 6:
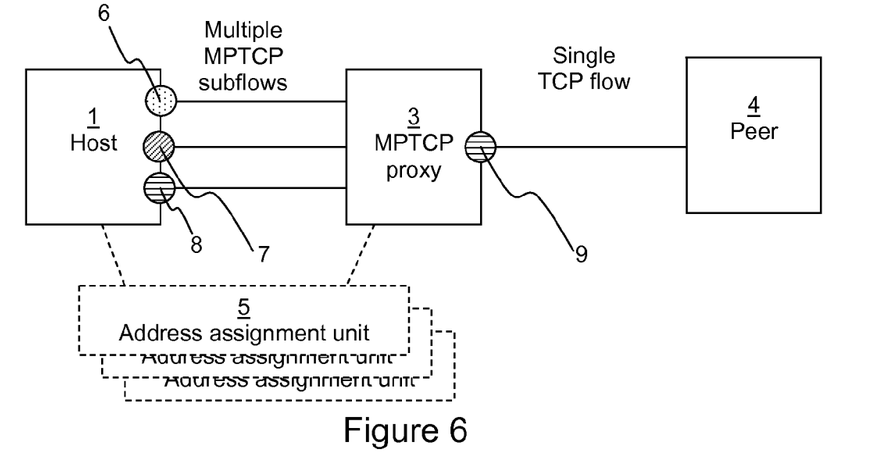
FIG. 6 illustrates schematically in a block diagram an exemplary network architecture for addressing a Multipath Transmission Control Protocol Session between two hosts where one host is not Multipath Transmission Control Protocol capable according to a further embodiment.

In a second exemplary embodiment, the MPTCP proxy node 3 chooses an address 9 to use based on prior knowledge.

The method described above in the first embodiment requires an interface between the MPTCP proxy node 3 and the address assignment unit(s) 5 of the host 1. This interface is exploited further in the second embodiment. The MPTCP proxy node 3 queries addresses of the host 1 before or when the host 1 establishes the first MPTCP subflow for the first TCP session with a peer 4. The MPTCP proxy node 3 uses this knowledge to select a proper address for the first and subsequent TCP flows to the peer 4.

Figure 7:
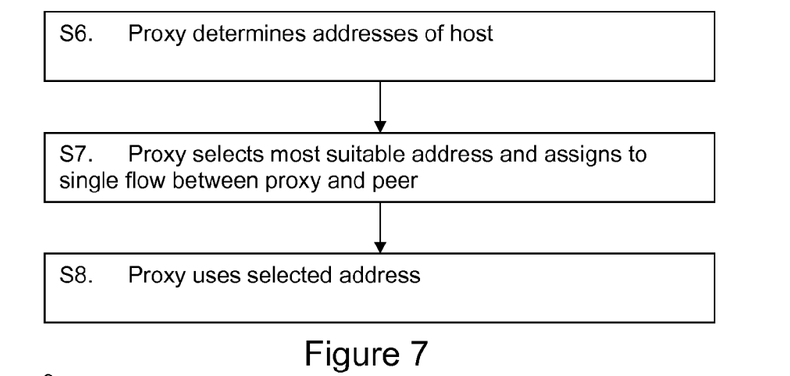
FIG. 7 is a flow diagram illustrating procedures according to the further embodiment of FIG. 6.

Considering the example shown in FIG. 7, the UE 1 has an LTE address and a WLAN address. The WLAN address may be different depending on the WLAN access point that the UE connects to, because WLAN handover with address preservation is typically not fully supported in existing networks. However, the LTE address typically remains the same, even when the UE 1 moves to a different LTE base station, and even when the UE 1 is temporarily out of LTE radio coverage. In such a scenario, the MPTCP proxy node 3 may prefer to use the LTE address of the UE 1 towards the peer 4, as this is less likely to change than a WLAN address.

If both PDN connections are routed via the same PGW, and the MPTCP proxy node 3 is co-located in that PGW product, then the PGW knows which addresses are available to the UE 1 on which access. The MPTCP proxy node 3 uses the UE's LTE address. Even if the UE 1 has no LTE address assigned (yet), for example because the UE 1 is not attached via LTE, the PGW may pre-allocate an LTE address for this UE 1.

The procedures described above for the second embodiment are summarized in FIG. 7. The following numbering corresponds to that of FIG. 7:

S6. The MPTCP proxy node 3 determines the addresses used by the host 1 for the subflows. This may be, for example, by querying the host 1 or the address assignment unit 5. Note that, as described above, these may include addresses that will be assigned to the host 1 but have not yet been assigned.
S7. The MPTCP proxy node 3 selects which address is most suitable to use as the address 9 for the single flow TCP communication with the peer 4. This selection can be done, for example, by applying a rule. If, for example, one of the addresses relates to an LTE network, then this may be selected as this address is likely to have a longer life.
S8. The MPTCP proxy node 3 uses the determined address as the address 9 to use towards the peer 4.

Note that the second embodiment is compatible with the first embodiment, in so far as the MPTCP proxy node 3 has an interface with the address assignment unit 5 and can request that the address assignment unit 5 does not release or re-use the address used between the MPTCP proxy node 3 and the peer 4.

Figure 8:
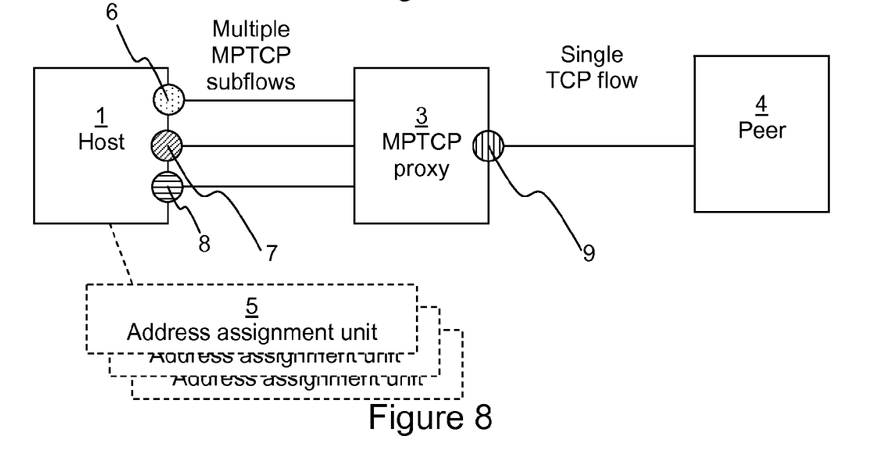
FIG. 8 illustrates schematically in a block diagram an exemplary network architecture for addressing a Multipath Transmission Control Protocol Session between two hosts where one host is not Multipath Transmission Control Protocol capable according to another embodiment.

According to a third embodiment, as illustrated in FIG. 8, the MPTCP proxy node 3 uses a different address altogether. The previous two embodiments assume that the MPTCP proxy node 3 uses an address that has been assigned to the host 1. However, there may be scenarios where this is not possible. The MPTCP proxy node 3 may not be on the routing path between host 1 and the peer 4. The host 1 may, in this case, still be capable to find the MPTCP proxy node 3 (e.g. the address of the MPTCP proxy node 3 is configured in the host 1). However, even if the MPTCP proxy node 3 could use one of the host's 1 addresses towards the peer 4, single flow TCP traffic from peer 4 to host 1 will not be routed via the MPTCP proxy node 3.

Furthermore, even in the case where the MPTCP proxy node 3 is on the routing path between the host 1 and the peer 4, it may not be desired to let the MPTCP proxy node 3 use one of the host's 1 addresses. One reason for this could be that the MPTCP proxy node 3 is not able to prevent the release of an address of the host 1. For example, it may be difficult or impossible for the MPTCP proxy node 3 to interface to the host's 1 address assignment unit(s) 5, such as the case where the MPTCP proxy node 3 is not co-located in a PGW as assumed in the previous use cases.

In this embodiment, the MPTCP proxy node 3 uses an address 9 towards the peer 4 that is different from all addresses used by the host 1. This address 9 may be used for multiple hosts simultaneously. Alternatively, this address 9 may be unique for a particular host, which allows the peer 4 to distinguish between different hosts.

Consider the case where the MPTCP proxy node 3 is co-located in a Radio Access Network (RAN) node. In this example, a UE 1 sets up two PDN connections, one via LTE and one via WLAN. Each PDN connection is routed via a different PGW. Assume that the MPTCP proxy node 3 is co-located in a node in the RAN, such as a base station or Radio Network Controller (RNC). The UE 1 sets up a TCP session with two subflows, one via each PDN connection. The MPTCP proxy node 3 decides to use the LTE address. If the LTE PDN connection is released, then the MPTCP proxy node 3 will still need to use that address. Assume that the proxy has an interface to PGW1 of the LTE PDN connection, and instructs PGW1 not to re-assign the address to another UE. As the LTE PDN connection is released, traffic from the MPTCP proxy node 3 to the peer 4 will need to be routed via the WLAN PDN connection and PGW2. The source address of that traffic will still be the address of the released LTE PDN connection. The problem here is that, in the downlink, the peer 4 will use the address of the LTE PDN connection. That address topologically belongs to PGW1; but that PGW has already released the LTE PDN connection. It will not be able to route downlink traffic to the correct UE 1.

Using a different address as described above solves this issue. The MPTCP proxy node 3 may acquire such an address by setting up a special PDN connection between MPTCP proxy node 3 and PGW.

Note that the MPTCP proxy node 3 does not know beforehand if a peer 4 is MPTCP-capable or not. Suppose the peer 4 is MPTCP-capable, then it may be preferred not to use a MPTCP proxy node 3 at all but to allow end-to-end MPTCP between the host 1 and the peer 4. If such a scenario is preferred, then the MPTCP proxy node 3 does not strip the MPTCP options in the initial setup of the TCP session (i.e. the initial TCP SYN exchange). Instead, the MPTCP proxy node 3 allows the initial TCP SYN from host 1 to peer 4 pass unchanged. In the TCP SYN ACK from peer 4 to host 1, the MPTCP proxy node 3 concludes from the TCP options whether or not the peer 4 is MPTCP capable. Letting the MPTCP proxy node 3 pass the TCP SYN from host 1 to peer 4 unchanged would no longer be possible in the methods described above, as the MPTCP proxy node 3 may change the source address. If the peer 4 indicates MPTCP capability in the TCP SYN ACK, the MPTCP proxy node 3 knows it should not have changed the address. To overcome this problem, the MPTCP proxy node 3 refrains from sending the TCP SYN ACK to the host 1. Instead, it sends a TCP reset to the peer 4 and re-sends the original TCP SYN to the peer 4, but this time without changing the source address. The subsequent TCP SYN ACK will be sent back to the host 1.

Figure 9:
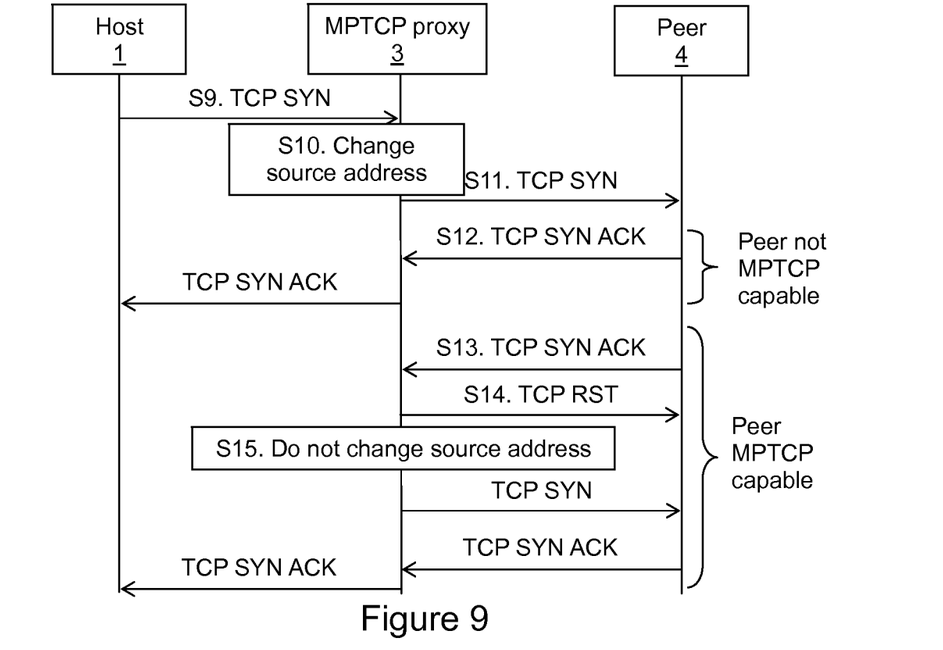
FIG. 9 is a signalling diagram showing a first exemplary way of determining whether the peer is MPTCP capable.

This is illustrated in the signalling diagram of FIG. 8. The MPTCP proxy 3 receives from the host 4 a request to establish a session with the peer 4, the request including an indication that the host is MPTCP capable. The request is forwarded to the peer 4, which responds with an indication of whether the peer is MPTCP capable. If the peer is not MPTCP capable, the MPTCP proxy knows that it must act as a proxy and assigns an address to a single flow message comprising a plurality of multipath messages. In the embodiment of FIG. 9, the MPTCP proxy 3 changes the original source address of the forwarded request to a new source address. If the peer 4 is MPTCP capable, the MPTCP proxy 3 changes the source address back to the original source address using a TCP reset. The following numbering corresponds to that of FIG. 9:

S9. The host 1 sends a TCP SYN packet requesting the establishment of a session towards the MPTCP proxy node 3, and including an indication that MPTCP is required, along with the source address of the host 1 and the destination address of the peer 4.

S10. The MPTCP proxy 3 changes the source address to that of the MPTCP proxy 3 and leaves the MPTCP option unchanged.

S11. The TCP SYN packet is forwarded to the peer 4.

S12. A response is sent from the peer 4 to the MPTCP proxy 3 (using the source address of the peer 4 and the destination address of the proxy 3). If the peer 4 is not MPTCP capable, the proxy recognises this in the response and knows that it must act as an MPTCP proxy if a new subflow is added.

S13. If the peer 4 is MPTCP capable, the MPTCP proxy recognises this in the response from the peer 4 (using the source address of the peer 4, the destination address of the MPTCP proxy 3 and an indication that the peer 4 is MPTCP capable).

S14/S15. The MPTCP proxy 3 sends a TCP reset towards the peer 4. It then re-sends the original packet without changing the source address (in other words, using the source address of the host and the destination address of the peer 4). This allows the peer to establish further subflows directly with the host 21. The proxy therefore recognises that it need not act as a proxy in the event that any new subflows are added.

Figure 10:
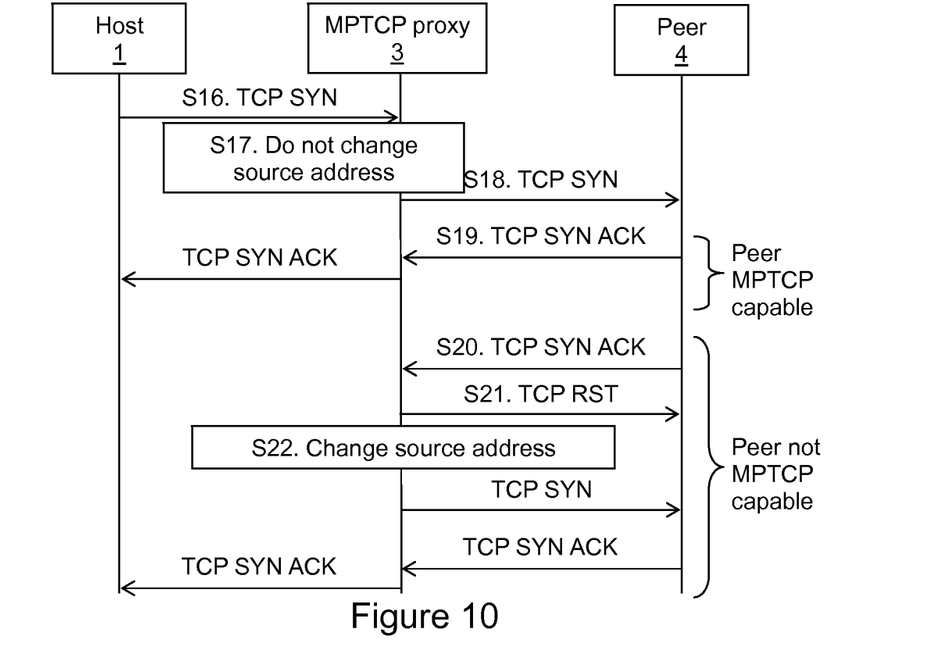
FIG. 10 is a signalling diagram showing a second exemplary way of determining whether the peer is MPTCP capable.

A variant of this process is illustrated in FIG. 10. It is similar to that of FIG. 9, but in the embodiment of FIG. 10, I the peer 4 is not MPTCP capable, the proxy node changes the original source address of the forwarded request message to a new source address using a TCP reset. The following numbering corresponds to that of FIG. 10.

S16. The host 1 sends a TCP SYN packet requesting the establishment of a session towards the MPTCP proxy node 3, and including an indication that MPTCP is required, along with the source address of the host 1 and the destination address of the peer 4.

S17. The MPTCP proxy 3 does not change the source address and leaves the MPTCP option unchanged.

S18. The TCP SYN packet is forwarded to the peer 4 (having the source address of the host 1 and the destination address of the peer 4).

S19. In the event that the peer 4 is MPTCP capable, it responds to the MPTCP proxy 3 which forwards the response to the peer 1. The MPTCP proxy 3 recognises that it need not act as a proxy in the event that new subflows are added, as both the host 1 and the peer 4 are MPTCP capable. The response includes the source address of the peer 4, the destination address of the host 1, and an indication that the peer is MPTCP capable.

S20. In the event that the peer 4 is not MPTCP capable, it responds to the MPTCP proxy (using the source address of the peer 4 and the destination address of the host 1). The MPTCP proxy 3 recognises that the peer 4 is not MPTCP capable as it does not include an MPTCP capable option.

S21/S22. The MPTCP proxy 3 sends a TCP reset to the peer 4. It then changes the source address such that the source address is that of the MPTCP proxy 3, and resends the original packet with the source address changed to that of the MPTCP proxy 3. This ensures that all future messages from the peer 4 are addressed to the MPTCP proxy 3. The MPTCP proxy 3 also recognises that it must act as a proxy node in the event that further MPTCP subflows are added.

Note that either or both of the techniques described in FIGS. 9 and 10 may be used. Where both techniques are used, the peer perceives two different TCP sessions. Note also that the methods shown in FIGS. 9 and 10 of determining whether the peer 4 is MPTCP capable can be used in isolation of the other methods described above of determining how to address TCP subflows. However, it will be appreciated that a combination of any of the first three embodiments with any of the embodiments illustrated in FIGS. 9 and 10 may also be advantageous.

Note that for the embodiments described above, the peer 4 may see a different address for non-TCP traffic from a host 1 compared to the address used for TCP traffic from that same host 1. This may confuse the peer 4. One solution to this may be to let the MPTCP proxy node 3 do Network Address Translation (NAT) for non-TCP traffic as well (e.g. User Datagram Protocol, UDP, traffic).

For example, assume the MPTCP proxy node 3 is co-located in a PGW as described in the second embodiment. Many PGWs already today implement a NAT function. If the MPTCP proxy node 3 is co-located in the PGW, that NAT function may be extended to do a n:1 network address translation in combination with the MPTCP proxy function.

All of a UE's 1 PDN connections would be translated to a single address. This way, not only handover without address preservation is concealed to the peer 4, the peer 4 will also be unaware that different traffic types (e.g. UDP and TCP) originate from different interfaces of the UE 1.

The embodiments described above are summarized in FIG. 11. The following numbering corresponds to that of FIG. 12.

Figure 11:
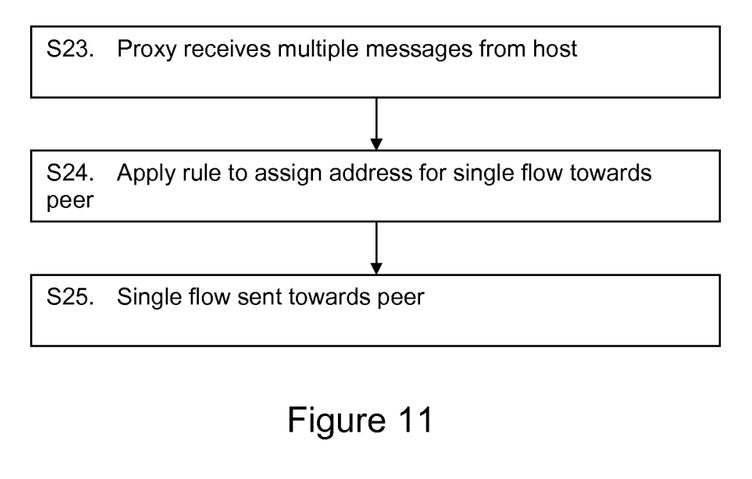
FIG. 11 is a flow diagram illustrating exemplary procedures.
Figure 12:
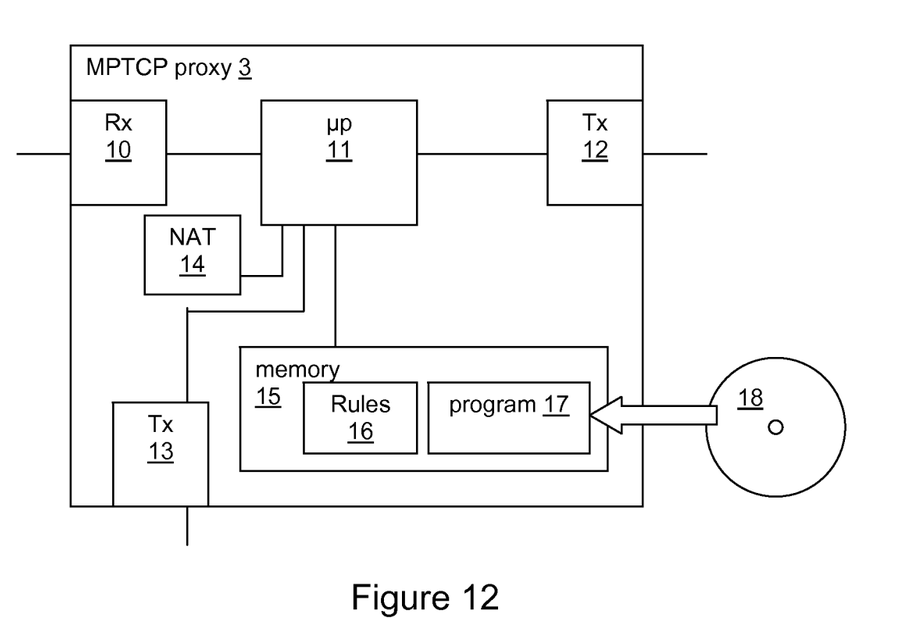
FIG. 12 illustrates schematically in block diagram an exemplary Multipath Transmission Control Protocol proxy node.

S23. The MPTCP proxy node 3 receives multiple MPTCP subflows from the host 1. Each MPTCP subflow is associated with an address.

S24. The MPTCP proxy node 3 applies a rule to assign an address for the single TCP flow to be used towards the peer 4. As described above, this rule may include using the address of the first subflow, using the address of the subflow that is likely to have the longest lifetime, or using a completely new address that is not used by any of the subflows.

S25. The single TCP flow with the assigned address is sent towards the peer 4.

FIG. 10 illustrates an MPTCP proxy node 3 according to any of the embodiments described above. The MPTCP proxy node 3 is provided with a first receiver 10 for receiving the multipath flows from the host 1. A processor 11 is also provided for applying a rule to assign an address for the TCP single flow to be sent towards the peer 4. This rule may include, for example, using the address of the first multipath flow, using the address of another multipath flow, or using a completely new address. A first transmitter 12 is also provided for sending the TCP single flow towards the peer 4.

In any of the embodiments described above, the MPTCP proxy node 3 may be provided with a second transmitter 13 arranged to send an instruction message to the address assignment unit 5. The instruction message instructs the address assignment unit 5 not to release or re-use the address that is being used for the TCP single flow sent towards the peer 4. This transmitter 13 may be subsequently used to allow the address assignment unit 5 to release or re-use the address once the TCP session with the peer 4 has ended.

A non-transitory computer readable medium in the form of a memory 15 may also be provided. This can be used to store rules 16 used by the processor 11 to assign an address to the TCP single flow.

The MPTCP proxy node 3 may also be provided with a NAT function 14 as described above for performing NAT on the flows sent between the host 1 and the peer 4.

The memory 15 may also be used for storing a computer program 17 which, when executed by the processor 11, causes the MPTCP proxy node 3 to behave as described above. Note that the program may be obtained from a remote source 18, such as a data carrier. Note also that the rules 16 and the program 17 are shown as being stored in a memory 15 located at the MPTCP proxy node 3, but it will be appreciated that they may be obtained from remote sources, or may be stored in different physical memories.

The embodiments described above illustrate different variants of the address used by the MPTCP proxy node 3 towards a peer 4. These variants can be used to optimize the address assignment, in particular if the MPTCP proxy node 3 is used in a telecom operator's network where a peer is not MPTCP-capable, can only send and receive single flow TCP signalling. The embodiments described above allow an address to be assigned to single flow TCP signalling where a host is MPTCP-capable and the peer is not.

The skilled person will appreciate that various modifications may be made to the above described embodiments. For example, many different examples are provided above. It will be appreciated that in some circumstances, combinations of those examples may be used.

The following abbreviations have been used in this specification:
3GPP 3rd Generation Partnership Project
E-UTRAN Evolved Universal Terrestrial Radio Access Network
GERAN GSM EDGE Radio Access Network
IETF Internet Engineering Task Force
IP Internet Protocol
LAN Local Area Network
LTE Long-term Evolution
MPTCP Multi-path TCP
NAT Network Address Translator
PDN Packet Data Network
PGW PDN Gateway
RAN Radio Access Network
RNC Radio Network Controller
TCP Transmission Control Protocol
UDP User Datagram Protocol
UE User Equipment
UTRAN Universal Terrestrial Radio Access Network
WLAN Wireless LAN

The invention claimed is:

1. A method of addressing a message sent from a proxy node to a peer node, the method comprising, at the proxy node:
   receiving from a host node a plurality of multipath messages, each message of the plurality of multipath messages having an address;
   applying a rule to assign an address for a single flow message towards the peer node, the single flow message comprising the plurality of multipath messages, wherein the applying the rule comprises:
      determining addresses for each message of the plurality of multipath messages;
      selecting from the determined addresses the address for assigning to the single flow message towards the peer node, wherein the selecting is performed based on any of a type of network to which each address belongs, an expected life of each address, and a historical life of each address; and
   sending to an address assigning node an instruction not to release or re-use the address for the single flow message; and
   sending the single flow message towards the peer node.

2. The method according to claim 1, wherein the plurality of multipath messages comprises Multipath Transmission Control Protocol messages and the single flow message comprises a Transmission Control Protocol.

3. The method according to claim 1, further comprising, at the proxy node:
   determining an address for a first message of the plurality of multipath messages;
   assigning the determined address to the single flow message towards the peer node; and
   sending to an address assigning node an instruction not to release or re-use the address for the single flow message.

4. The method according to claim 1, wherein the determined addresses include at least one address expected to be assigned to the host.

5. The method according to claim 1, further comprising sending to an address assigning node an instruction not to release or re-use the selected address.

6. The method according to claim 1, further comprising:
   assigning a new address for the single flow message towards the peer node, the assigned address not being used for any of the plurality of multipath messages.

7. The method according to claim 6, wherein the assigned address is unique to a single host.

8. The method according to claim 1, further comprising, at the proxy node:
   performing network address translation on each message of the plurality of multipath messages.

9. A proxy node for use in a mobile communications network, the proxy node comprising:

a first receiver for receiving from a host node a plurality of multipath messages, each message of the plurality of multipath messages having an address;

a processor for applying a rule to assign an address for the host node for a single flow message towards a peer node, the single flow message comprising the plurality of multipath messages, wherein the applying the rule comprises determining addresses for each message of the plurality of multipath messages and selectins from the determined addresses an address to assign to the single flow message towards the Deer node, and wherein the selecting is performed based on any of the type of network to which each address belongs, the expected life of each address, and the historical life of each address; and a first transmitter for sending the single flow message towards the peer node.

10. The proxy node according to claim 9, wherein the plurality of multipath messages comprises Multipath Transmission Control Protocol messages and the single flow message comprises a Transmission Control Protocol.

11. The proxy node according to claim 9, wherein the processor is arranged to determine an address for a first message of the plurality of multipath messages and assign the determined address to the single flow message towards the peer node, the proxy node further comprising:

a second transmitter for sending to an address assigning node an instruction not to release or re-use the address for the single flow message.

12. The proxy node according to claim 9, further comprising a second transmitter for sending to an address assigning node an instruction not to release or re-use the selected address.

13. The proxy node according to claim 9, wherein the processor is arranged to assign an address to the single flow message towards the peer node, the assigned address not being used for any of the plurality of multipath messages.

14. The proxy node according to claim 13, wherein processor is arranged to assign an address that is unique to a single host.

15. The proxy node according to claim 9, further comprising a network address translation function for performing network address translation on each message of the plurality of multipath messages.

16. A non-transitory computer-readable medium containing computer readable code means which, when run in a processor in a proxy node, causes the proxy node to perform a method of addressing a message sent from the proxy node to a peer node, the method comprising:

receiving from a host node a plurality of multipath messages, each message of the plurality of multipath messages having an address;

applying a rule to assign an address for a single flow message towards the peer node, the single flow message comprising the plurality of multipath messages, wherein the applying the rule comprises:

determining addresses for each message of the plurality of multipath messages, selecting from the determined addresses the address for assigning to the single flow message towards the peer node, wherein the selecting is performed based on any of a type of network to which each address belongs, an expected life of each address, and a historical life of each address; and sending to an address assigning node an instruction not to release or re-use the address for the single flow message; and sending the single flow message towards the peer node.

* * * * *

UNITED STATES PATENT AND TRADEMARK OFFICE
CERTIFICATE OF CORRECTION

PATENT NO. : 9,843,646 B2
APPLICATION NO. : 14/440136
DATED : December 12, 2017
INVENTOR(S) : Roeland et al.

It is certified that error appears in the above-identified patent and that said Letters Patent is hereby corrected as shown below:

In the Specification

In Column 5, Line 30, delete "node; and" and insert -- node. --, therefor.

In the Claims

In Column 13, Lines 4-5, in Claim 9, delete "an address for the host node for a" and insert -- an address for a --, therefor.

In Column 13, Line 10, in Claim 9, delete "selectins" and insert -- selecting --, therefor.

In Column 13, Line 12, in Claim 9, delete "Deer node," and insert -- peer node, --, therefor.

Signed and Sealed this
Eighth Day of May, 2018

Andrei Iancu
*Director of the United States Patent and Trademark Office*